United States Patent Office
3,300,277
Patented Jan. 24, 1967

3,300,277
HYDRATED MAGNESIUM ALUMINATE AND PROCESS FOR PREPARING SAME
Remsen Ten Eyck Schenck, Bangor, Pa., assignor to Keystone Chemurgic Corporation, Bethlehem, Pa., a corporation of Pennsylvania
No Drawing. Original application Oct. 29, 1963, Ser. No. 319,644. Divided and this application Oct. 21, 1965, Ser. No. 512,252
16 Claims. (Cl. 23—52)

This application is a division of my copending application S.N. 319,644, filed Oct. 29, 1963, which application was a division of my then copending application S.N. 59,155, filed Sept. 29, 1960, now abandoned, which application was a continuation-in-part of my then copending application S.N. 839,303, filed Sept. 11, 1959, and now abandoned, which application was a continuation-in-part application of my then copending application S.N. 647,448, filed Mar. 21, 1957, and now abandoned.

The present invention relates to a new chemical compound consisting of hydrated magnesium aluminate, and processes for its production.

The anhydrous form of magnesium aluminate, $MgAl_2O_4$, is exemplified by the well-known mineral spinel. It has also been synthesized by heating at a very high temperature a mixture of magnesium and aluminum oxides. In this state, it is comparatively inert toward nearly all chemical reagents, and possesses a high fusing point. Particularly well-crystallized specimens are valued as gemstones; except for this and some limited use as a refractory, the substance is of little interest chemically and of none at all biologically.

It has also been proposed to produce metal aluminates by reacting an alkali metal aluminate and a salt of a metal. Reactions of this sort are described in U.S. Patents 2,395,931 and 2,413,184 and result in products which are relatively inactive chemically and which have substantially lower water contents and greater particle size characteristics than the product of the present invention.

I have now discovered that magnesium aluminates may be economically prepared in a hitherto-undescribed, highly hydrated and chemically active form. When produced by one of the wet processes hereinafter described, hydrated magnesium aluminate is a finely-divided, tasteless, insoluble white powder which, in contrast to the magnesium aluminate products hitherto known is highly reactive toward many chemical reagents, notably toward acids.

A suspension of the hydrated magnesium aluminate of the present invention in distilled water shows a pH of 8.0 to 8.5. On addition of dilute acid, such as N/10 HCl, the first action involves decomposition of the molecule into aluminum hydroxide and magnesium chloride. The latter dissolves, while the former remains suspended in a very highly active form. Two equivalents of acid are consumed in this step, and the pH drops to approximately 4. Further additions of acid to the mixture react with the liberated aluminum hydroxide. This step takes place at a constant pH: no reduction of pH below 4 can occur until all the aluminum hydroxide is consumed. Since six additional equivalents of acid are required for this, the buffer action of the hydrated magnesium aluminate of the present invention in the region of pH 4 is pronounced.

By virtue of the above properties, the hydrated magnesium aluminate of the present invention is of interest pharmacologically, as a treatment for excessive gastric acidity. Unlike many other remedies of this type, it cannot over-alkalize the gastric juice when used in normal or usual doses. It establishes a pH in the ideal range near 4 in the stomach, and maintains this for an extended period in spite of continual secretion of additional acid by the stomach.

The term "hydrated magnesium aluminate" as used throughout this specification and in the appended claims is intended to designate the product of the present invention, as produced by the processes herein disclosed and which is characterized by a water content of from 50% to 60%.

The hydrated magnesium aluminate of this invention is devoid of toxicity, its metabolic products being simple magnesiumb and aluminum salts, and may thus be freely ingested: the dosage required is small because of its low equivalent weight. In spite of the relatively high degree of hydration of the salt, the equivalent weight is only 40, which is comparable with those of calcium carbonate and magnesium carbonate, and less than half as great as that of sodium bicarbonate.

Hydrated magnesium aluminate contains no carbon dioxide, and thus is not a carminative. In some applications this is a decided benefit, as for instance where a simple antacid effect, unaccompanied by eructation, is desired.

Few side-effects, and those of no importance, have been reported to accompany the use of aluminum and magnesium compounds as antacids. The former occasionally produces a slight tendency to constipation, while the latter sometimes has a laxative action. Neither effect is appreciable in normal dosage. Furthermore, it is believed that combining the two substances in a single treatment, as in hydrated magnesium aluminate, results in cancellation of the two factors.

Hydrated magnesium aluminate may profitably be used as an additional ingredient in pharmaceutical formulations designed primarily for other purposes than control of gastric acidity. For example, certain substances widely employed as analgesics have, as a side-effect, the property of irritating the gastric mucosa into secreting more than the normal amount of acid. The hydrated magnesium aluminates of the present invention may be advantageously incorporated with such analgesics.

I have discovered two processes for producing a pure hydrated magnesium aluminate in finely divided form and having a water content of from 50% to 60%. The first of these processes consists in adding an alkali metal aluminate solution to a solution of a magnesium salt and simultaneously adding an acid at a rate such that the pH remains within a range in which the upper limit is the pH at which magnesium hydroxide can precipitate and the lower limit is the pH at which aluminum hydroxide precipitates more rapidly than magnesium aluminate is formed. This range is from pH 6 at the lower limit to pH 10 at the upper limit.

The second process consists in first preparing a slurry of basic aluminum magnesium carbonate in water, and then boiling this slurry. In the boiling the carbonate is hydrolyzed and carbon dioxide is liberated. When no further carbon dioxide can be driven off by continued boiling, the residual insoluble salt consists of hydrated magnesium aluminate.

The processes referred to above for preparing hydrated magnesium aluminate are illustrated in more specific detail in the following examples:

*Example 1*

In a reaction vessel equipped with a mechanical stirrer, means for adding simultaneously two separate liquids at individually controlled rates, and a set of electrodes for determination of the pH of the mixture, is placed a solution of 75 gms. of magnesium chloride in 1 liter of water. A quantity of sodium aluminate containing 0.4 gram-atoms of aluminum, corresponding to 33 gm. of actual $NaAlO_2$, is dissolved in 2 to 4 times its own weight of water to make a fairly concentrated solution, and this is allowed to flow slowly into the stirred magnesium solution. The pH of the mixture, which is close to 7 initially, begins to increase as aluminate solution is added. When it reaches 8, the simultaneous addition of dilute hydrochloric acid (conveniently of about 10% strength) is commenced. The flow of both sodium aluminate and hydrochloric acid solutions is so regulated throughout that the pH of the reaction mixture is maintained between 8 and 9. When all the aluminate solution has been added, the flow of acid is likewise terminated. The final reaction mixture should have a pH of 8 to 9. The precipitate is collected by filtration or centrifugation, adherent mother liquor being displaced by a brief washing of the cake with water. By drying and grinding the resulting magma, there is obtained approximately 60 gm. of a finely-divided white powder which is rapidly and completely soluble in dilute acids. A typical analysis of this product is:

$$Al_2O_3, 31.7\%;\ MgO,\ 12.4\%$$

which corresponds to the formula $MgAl_2O_2(OH)_4 \cdot 8H_2O$, or $MgO \cdot Al_2O_3 \cdot 10H_2O$. The water content is thus about 56%, and this figure should be maintained within the range of about 50–60% water in order to obtain the active hydrated magnesium aluminate of the present invention. In the range from about 50–60% water, the formula for the hydrated magnesium aluminate of the present invention covers the range from $MgO \cdot Al_2O_3 \cdot 8H_2O$ to $MgO \cdot Al_2O_3 \cdot 12H_2O$.

*Example 2*

In a reaction vessel equipped with a mechanical stirrer, a means for heating the contents, a gas inlet and dispersion tube, a means for adding liquid at a controlled rate, and a set of electrodes for determination of the pH of the mixture, is placed a solution of 75 gm. of magnesium chloride in 1 liter of water. With the stirrer in vigorous operation, a steady stream of carbon dioxide is allowed to flow into the solution through the gas dispersion tube. A quantity of sodium aluminate containing 0.4 gram-atoms of aluminum, corresponding to 33 gm. of actual $NaAlO_2$, is dissolved in 2 to 4 times its own weight of water to make a fairly concentrated solution, and this is allowed to flow slowly into the stirred, carbonated magnesium chloride solution at such a rate as to keep the mixture very faintly basic, preferably at a pH between 7 and 9. When all the sodium aluminate solution has been added, the flow of carbon dioxide is stopped and the precipitate is separated as completely as possible, by filtration or centrifugation, from the mother liquor. The cake is returned to the reactor and redispersed in 1 liter of fresh water. Heat is applied to the resulting slurry, and the suspension is boiled until carbon dioxide is no longer evolved. It is then again filtered or centrifuged and the resulting magma is then dried and finely ground. The product is similar in all respects to that obtained in Example 1.

*Example 3*

Aluminum hydroxide gel is prepared, by known methods leading to a product of highest activity, as a paste containing approximately 10% of $Al_2O_3$ by weight. A quantity of this paste corresponding to 0.4 gram-atoms of aluminum (204 gm. of 10% gel) is added to 1.1 liters of an aqueous solution of magnesium bicarbonate of 0.2 molar concentration, and the mixture is stirred until a uniform dispersion is obtained. This is introduced into a pressure vessel equipped with a stirrer, a gas inlet tube, and a means for heating the contents. Under continuous stirring, the air in the reactor is replaced by an atmosphere of carbon dioxide; the vessel is then sealed and additional carbon dioxide is admitted to a pressure of 1 to 3 atmospheres. When equilibrium has been established and gas is no longer absorbed by the contents of the reactor, the carbon dioxide supply line is shut off and heat is applied to the vessel. The temperature is maintained, with uninterrupted stirring, between 50 and 100° C. for several hours; at the end of this time the reaction mixture is cooled, the pressure is released, and the precipitate is separated from the mother liquor by filtration or centrifugation. The cake is resuspended in about 1 liter of fresh water, and the resulting slurry is gently boiled until carbon dioxide is no longer evolved. The magma is again dewatered; on drying and grinding it yields a product similar in all respects to that described in Example 1.

*Example 4*

In a reaction vessel equipped with a mechanical stirrer, a gas inlet and dispersion tube, and a means for adding liquid at a controlled rate, is placed 1.1 liters of an aqueous solution of magnesium bicarbonate of 0.2 molar concentration. With the stirrer in vigorous operation, a steady stream of carbon dioxide is allowed to flow into the solution through the gas dispersion tube. To this stirred, carbonated magnesium solution there is slowly added, at a rate such that local excesses are avoided and thorough mixing is promptly achieved, 82 gm. (0.4 mole) of liquid aluminum isopropoxide, either as the super-cooled molten form or as a solution in a minimum of warm absolute isopropyl alcohol. The mixture is stirred for a few minutes after addition is complete, and the precipitated product is collected by filtration, centrifugation or decantation. The cake, freed as completely as possible from mother liquor, is resuspended in about 1 liter of fresh water and the slurry is gently boiled until carbon dioxide is no longer evolved. The resulting magma is then dewatered; upon drying and grinding it affords a product similar in all respects to that obtained in Example 1.

*Example 5*

In a reaction vessel equipped with a mechanical stirrer, means for adding simultaneously two separate liquids at individually controlled rates, and a set of electrodes for determination of the pH of the mixture, is placed a solution of 75 gms. of magnesium chloride in 1 liter of water. A quantity of sodium aluminate containing 0.4 gram-atoms of aluminum, corresponding to 33 gm. of actual $NaAlO_2$, is dissolved in 2 to 4 times its own weight of water to make a fairly concentrated solution, and this is allowed to flow slowly into the stirred magnesium solution. The pH of the mixture which is close to 7 initially, begins to increase as aluminate solution is added. When it reaches 8, the simultaneous addition of dilute acetic acid (conveniently of about 10% strength) is commenced. The flow of both sodium aluminate and acetic acid solutions is so regulated throughout that the pH of the reaction mixture is maintained between 8 and 9. When all the aluminate solution has been added, the flow of acid is likewise terminated. The final reaction mixture should have a pH of 8 to 9. The precipitate is collected by filtration or centrifugation, adherent mother liquor being displaced by a brief washing of the cake with water. By drying and grinding the cake, there is obtained approximately 60 gm. of a finely-divided white powder which is rapidly and completely soluble in dilute acids.

While I have described the present invention in terms of preferred examples, it will be understood that various modifications and supplemental steps may be employed in carrying out the process as defined in the appended claims. For instance in the step of regulating the pH by addition of dilute acid, other common acids may be substituted for those described: any acid which forms a soluble salt with magnesium may be chosen. Furthermore, both the magnesium salt and the alkali metal aluminate may be dissolved in water to give solutions of concentrations widely different from the specific examples cited. Likewise, the alkali metal aluminate may be the aluminate of lithium, sodium, potassium, rubidium, or cesium, although the sodium or potassium aluminate is preferred as being more readily available. The proportions of magnesium and aluminum taken may be stoichiometrically exact, or the magnesium may be taken in excess over a wide range.

For use as an antacid, the hydrated magnesium aluminate of this invention is preferably tabletted in unit doses containing approximately 5 grains of the active ingredient per tablet. Sugar, dextrin or other binder can be used in the tabletting operation.

For the treatment of gastric hyperacidity, these tablets are taken by mouth. A single 5-grain dose is nearly always sufficient to afford prompt relief. If distress recurs, the dose may be repeated. Following treatment with the product of the present invention, the duration of effective gastric acidity control is more prolonged than that attained with products that do cause acid rebond.

Having thus described my invention, I claim:

1. As a new composition of matter, the compound $MgO \cdot Al_2O_3 \cdot xH_2O$, wherein $x$ is an integer from 8 to 12 inclusive, and which is soluble in dilute acids.

2. The process for preparing hydrated magnesium aluminate wherein a solution of an alkali metal aluminate is mixed with a solution of a soluble salt of magnesium selected from the group consisting of magnesium chloride and magnesium acetate, in the proportions of at least ½ gram-atom of Mg per gram-atom of Al used, with the simultaneous introduction into the mixture of a dilute solution of an acid selected from the group consisting of hydrochloric acid and acetic acid at a rate such that the mixture at all times is maintained at a pH between 6 and 10, thereby obtaining as a precipitate hydrated magnesium aluminate.

3. The process of claim 2 in which the alkali metal aluminate is sodium aluminate.

4. The process of claim 2 in which the alkali metal aluminate is potassium aluminate.

5. The process for preparing hydrated magnesium aluminate wherein a solution of an alkali metal aluminate is mixed with a solution of a soluble salt of magnesium selected from the group consisting of magnesium chloride and magnesium acetate in the proportions of at least one-half gram-atom of magnesium per gram-atom of aluminum used, the mixture being kept saturated at all times with carbon dioxide at approximately one atmosphere pressure, whereby a precipitate is formed, and then boiling the precipitate with water, thereby obtaining as a precipitate hydrated magnesium aluminate.

6. The process of claim 5 in which the alkali metal aluminate is sodium aluminate.

7. The process of claim 5 in which the alkali metal aluminate is potassium aluminate.

8. The process of preparing hydrated magnesium aluminate wherein freshly-precipitated aluminum hydroxide gel is heated under super-atmospheric pressure with a solution containing magnesium bicarbonate, in the proportions of at least one-half gram-atom of magnesium per gram-atom of aluminum used, and an excess of carbon dioxide, whereby a precipitate of basic aluminum magnesium carbonate is formed and then boiling the precipitate with water in an open vessel after completion of the reaction under pressure thereby liberating carbon dioxide, and recovering hydrated magnesium aluminate in the form of an insoluble salt.

9. The process of preparing hydrated magnesium aluminate wherein aluminum isopropoxide is mixed with a solution of magnesium bicarbonate, in the proportions of at least one-half gram-atom of magnesium per gram-atom of aluminum used, in the presence of an excess of carbon dioxide whereby a precipitate of basic aluminum magnesium carbonate is formed and then boiling the precipitate with water in an open vessel after addition is complete thereby liberating carbon dioxide and recovering hydrated magnesium aluminate in the form of an insoluble salt.

10. As a new composition of matter, the compound $MgO \cdot Al_2O_3 \cdot 10H_2O$.

11. The process for preparing hydrated magnesium aluminate wherein a solution of an alkali metal aluminate is mixed with a solution of a soluble salt of magnesium selected from the group consisting of magnesium chloride and magnesium acetate in the proportions of at least ½ gram-atom of Mg per gram-atom of Al used, with the simultaneous introduction into the mixture of a dilute solution of an acid selected from the group consisting of hydrochloric acid and acetic acid at a rate such that the mixture at all times is maintained at a pH between 6 and 10, and then drying and grinding the resulting precipitate to obtain a finely divided white powder.

12. The process of claim 11 in which the alkali metal aluminate is sodium aluminate.

13. The process of claim 11 in which the alkali metal aluminate is potassium aluminate.

14. The process for preparing hydrated magnesium aluminate wherein a solution of an alkali metal aluminate is mixed with a solution of a soluble salt of magnesium selected from the group consisting of magnesium chloride and magnesium acetate in the proportions of at least one-half gram-atom of magnesium per gram-atom of aluminum used, the mixture being kept saturated at all times with carbon dioxide at approximately one atmosphere pressure, whereby a precipitate is formed, and then boiling the precipitate with water thus liberating carbon dioxide, and recovering hydrated magnesium aluminate in the form of an insoluble salt.

15. The process of claim 14 in which the alkali metal aluminate is sodium aluminate.

16. The process of claim 14 in which the alkali metal aluminate is potassium aluminate.

References Cited by the Examiner

UNITED STATES PATENTS

| | | | |
|---|---|---|---|
| 2,880,136 | 3/1959 | Gore | 23—52 X |
| 2,923,660 | 2/1960 | Hallmann | 23—52 X |
| 2,958,626 | 11/1960 | Schenck et al. | 23—14 X |

FOREIGN PATENTS 70,175    12/1892    Germany.

OTHER REFERENCES

Prasek: Chemical Abstracts, vol. 25, 1931, p. 653.

OSCAR R. VERTIZ, *Primary Examiner.*

H. T. CARTER, *Assistant Examiner.*